United States Patent Office 2,945,875
Patented July 19, 1960

2,945,875

CHLORINATION OF AROMATIC POLYISOCYANATES

James Junkichi Tazuma, Trenton, N.J., assignor to Food Machinery and Chemical Corporation, New York, N.Y., a corporation of Delaware No Drawing. Filed Apr. 1, 1957, Ser. No. 649,621

8 Claims. (Cl. 260—453)

This invention relates to the chlorination and bromination of aromatic polyisocyanates. More particularly, this invention relates to the chlorination and bromination of the benzene nucleus of aromatic polyisocyanates.

Aromatic polyisocyanates, particularly aromatic diisocyanates having a benzene nucleus, such as m-phenylene diisocyanate, p-phenylene diisocyanate, 2,4- and 2,6-tolylene diisocyanate and mixtures of these have found considerable application in recent years as intermediates in the manufacture of rigid and flexible foams, adhesive coatings, and highly abrasion-resistant rubber substitutes.

In certain of these applications, it has been found advantageous to replace part or all of the aromatic diisocyanate by a halogenated aromatic diisocyanate. For example, the halogenated aromatic isocyanates are generally more reactive with active-hydrogen compounds, such as alcohols, phenols, amines, mercaptans, and carboxylic acids, than are the corresponding non-halogenated isocyanates. Furthermore, compositions derived from halogenated aromatic diisocyanates tend to exhibit enhanced flame resistance, greater stability towards sunlight, and other desirable qualities.

It has been suggested to prepare chlorinated aromatic diisocyanates by dissolving the diisocyanate in an inert solvent, such as carbon tetrachloride, chloroform and tetrachloroethane, and then pass chlorine gas through the diisocyanate solution. Such a system has the following disadvantages, namely, necessity of separating the solvent and reaction product, slow rate of reaction and low volume-productivity.

Furthermore, said solvent system results in the formation of an intermediate carbamyl chloride which must be further reacted to yield the chlorinated isocyanate.

It is an object of this invention to provide an economical process for the preparation of mono and di-chlorinated or brominated aromatic polyisocyanates having a benzene nucleus, wherein the halogen is nuclear substituted.

It is a further object of this invention to provide a process for preparing mono and di-chlorinated or brominated aromatic polyisocyanates of this invention that avoids the use of a solvent and its attendant disadvantages.

Other objects will appear to those skilled in the art as the description of this invention unfolds.

Generally stated, this invention provides a process for preparing mono and di-chlorinated or brominated aromatic polyisocyanates, said aromatic polyisocyanates having one or more benzene rings as the nuclear group or groups and the chlorine or bromine being substituted in the benzene ring. It has been discovered that aromatic polyisocyanates having a benzene ring or rings as the nuclear group may be chlorinated or brominated by reacting halogen and a liquefied polyisocyanate.

Thus, contrary to the teachings of the prior art that it is necessary to employ a solvent to effect chlorination or bromination of aromatic polyisocyanates, it has been found that by directly chlorinating or brominating a molten or liquid polyisocyanate, a mixture of mono and di-chlorinated or dibrominated product is obtained in excellent yield.

Examples of the aromatic polyisocyanates which may be chlorinated or brominated in accordance with this invention are p-phenylene diisocyanate, m-phenylene diisocyanate, 4,4'-biphenylene diisocyanate, 3,3'-dimethyl-4,4'-biphenylene diisocyanate, 4,4'-methylene bis(phenyl isocyanate), 4,4'-methylene bis(2-methyl phenyl isocyanate), 2,4-tolylene diisocyanate, corresponding triisocyanates and mixtures of these compounds.

Table I is a listing of the melting points of several of the diisocyanates of this invention.

TABLE I

| Compound | Solidification or Melting Point (° C.) |
|---|---|
| m-phenylene diisocyanate | 53 |
| p-phenylene diisocyanate | 91 |
| 2,4-tolylene diisocyanate | 21 |
| 4,4'-biphenylene diisocyanate | 122 |
| 3,3'-dimethyl-4,4'-biphenylene diisocyanate | 69 |
| 4,4'-methylene bis(phenyl isocyanate) | 37 |
| 4,4'-methylene bis(2-methylphenyl isocyanate) | 31 |

The chlorination or bromination may be performed at a temperature above the melting point and below the boiling point of the particular polyisocyanate. A preferred temperature is between 150°–160° C.

Chlorine may be introduced into the reactor by having a conventional gas inlet tube situated below the liquid level. Preferably, the chlorine is introduced at or near the bottom of the reactor. Though the passage through the reaction mass of unreacted chlorine and by-product HCl function as an agitating force, it is preferable to provide agitating means, such as a mechanical stirrer.

In the case of bromination, liquid bromine may be added in desired portions. When brominating, it is preferred to agitate the liquid polyisocyanate by mechanical means.

The halogenation is ordinarily conducted at atmospheric pressure though superatmospheric pressures may be used advantageously in some instances.

Materials of construction that resist corrosion by chlorine, bromine, hydrogen chloride, hydrogen bromide polyisocyanate and chlorinated and brominated polyisocyanate are preferred. Equipment may be fabricated of glass, porcelain, glass-lined steel, stainless steel, or carbon steel.

Depending upon the temperature of the reaction, the polyisocyanate will be more or less dichlorinated. The higher the temperature, the greater will be the amount of dichlorinated product.

For most commercial uses of the chlorinated polyisocyanates, it is not necessary that a separation of the mono and di-chlorinated components be undertaken. However, if need be, the two components may be separated by rectification or recrystallization from a suitable solvent, such as hexane.

Furthermore, the chlorination and distillation steps may be carried out either continuously or batchwise.

Following is set forth examples serving to illustrate this invention.

*Example 1*

The apparatus used in this example comprises a 500 ml. 3-neck flask fitted with a thermometer, a mechanical stirrer, a gas inlet tube extending below the liquid level, and an electrically heated Vigreaux column. The Vigreaux column is maintained at about 100° C. throughout the chlorination. The flask is charged with 160.8 (1.0 mol) grams of m-phenylene diisocyanate and warmed to 150° C. Chlorine is passed in at a rate of 1.5 mols per hour for a period of 4.5 hours. During this period, the temperature is maintained between 150° and 160° and about 1.88 mols of chlorine is reacted with the diisocyanate. The chlorinated reaction product is vacuum distilled and recovery had of 97% of the reaction mixture boiling between 143–160° C. at a pressure 21 mm. Hg. This product comprised about 40% monochloro and 60% dichloro-1,3-phenylene diisocyanate.

*Example II*

The apparatus used in this example is the same as in Example I. The Vigreaux column being maintained at 100° C. throughout the chlorination. The flask was charged with 161 grams (1 mol) of m-phenylene diisocyanate and warmed to 150° C. Chlorine was passed into the liquid diisocyanate at a rate of 1.5 mols per hour for a period of 4.5 hours. During this period the temperature was maintained between 120°–130° C. About 1.3 mols of chlorine reacted with the diisocyanate. The chlorinated reaction product was vacuum distilled and recovery had of 95% of the reaction mixture boiling between 152° and 175° C. at pressure between 38 to 46 mm. Hg. This product comprised about 70% monochloro and 30% dichloro-1,3-phenylene diisocyanate.

Table II shows physical constants for mono and dichloro m-phenylene diisocyanate.

*Table II*

| Compound | Boiling Point (° C.)/mm. Pressure (Hg) | Melting Point (° C.) | Analysis | | |
|---|---|---|---|---|---|
| | | | Cl | C | H |
| Monochloro | 155–56/34 | 70 | 18.2 | 49.4 | 1.55 |
| Dichloro | 176–77/33 | 84 | 30.9 | 42.0 | 0.9 |

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

That which is claimed as patentably novel is:

1. The method of preparing mono- and di-nuclear halogenated aromatic diisocyanates which comprises reacting a halogen selected from the group consisting of chlorine and bromine with a molten mass of an unsubstituted aromatic diisocyanate selected from the group consisting of phenyl, biphenyl and methylene bisphenyl diisocyanates at a temperature above the melting point and below the boiling point of the diisocyanate, and in the absence of solvent, thereby substituting halogen on the aromatic nucleus of the diisocyanate to produce said nuclear halogenated diisocyanate.

2. The method of preparing a mixture of mono- and di-chlorinated meta-phenylene diisocyanates which comprises reacting chlorine with a molten mass of meta-phenylene diisocyanate, at a temperature of about 120–160° C., in the absence of solvent, thereby substituting chlorine on the aromatic nucleus of the meta-phenylene diisocyanate to produce said mixture of mono- and di-chlorinated meta-phenylene diisocyanates.

3. The method of claim 1, wherein the aromatic diisocyanate is a phenylene diisocyanate.

4. The method of claim 1, wherein the aromatic diisocyanate is a meta-phenylene diisocyanate.

5. The method of claim 1, wherein the diisocyanate is a biphenyl diisocyanate.

6. The method of claim 1, wherein the diisocyanate is a methylene bisphenyl diisocyanate.

7. The method of claim 1, wherein the halogen is chlorine.

8. The method of claim 1, wherein the halogen is bromine.

References Cited in the file of this patent

Siefken: Justus Liebigs Annalen der Chemie, 1949 (Bande 562), pgs. 90–91.

Groggins: "Unit Processes in Organic Synthesis," fourth edition, 1952, pgs. 206–207.